Oct. 25, 1938.   J. STANEK   2,134,589
APPARATUS FOR MEASURING HIGH FREQUENCY ALTERNATING CURRENTS
Filed Nov. 21, 1936
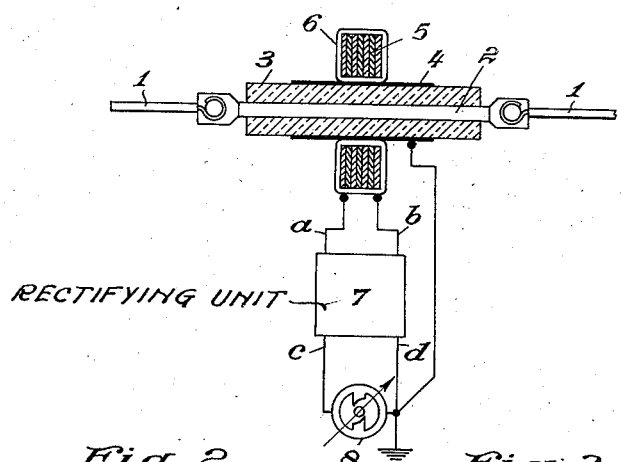
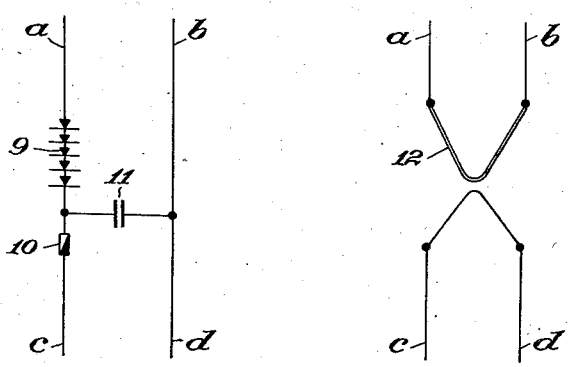 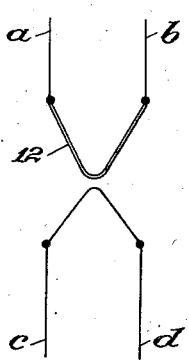
Inventor
Josef Stanek
by Knight Bros
attorneys Patented Oct. 25, 1938

2,134,589

UNITED STATES PATENT OFFICE 2,134,589

APPARATUS FOR MEASURING HIGH-FREQUENCY ALTERNATING CURRENTS

Josef Stanek, Berlin-Siemensstadt, Germany, assignor to Siemens & Halske Aktiengesellschaft, Siemensstadt, near Berlin, Germany, a corporation of Germany Application November 21, 1936, Serial No. 111,988
In Germany October 11, 1934

8 Claims. (Cl. 171—95)

My invention relates to an apparatus for measuring high-frequency alternating currents, and has for its object the provision of means capable of measuring alternating currents of very high frequency, such as are employed in wireless communication. To this end, a thermo-converter has been hitherto employed, the heating conductor being directly inserted in the circuit to be measured and under certain circumstances an insulation being interposed between the thermo-element and the heating conductor. This known arrangement consumes a relatively large amount of energy. Furthermore, the insulating layer between the heating conductor and the thermo-element must be as thin as possible to avoid impairing of the heat transfer. However, in some cases the current to be measured has a relatively high voltage so that the insulation of the thermo-couple does not suffice therefor and particular highly interfering provisions must be made. Furthermore, the thermo-converter can be overloaded only to a slight degree so that there is always a danger of a breakdown of the thermo-converter. In such a breakdown the circuit to be measured is interrupted, i. e., the entire system in which the measuring instrument is inserted is put out of operation.

In all forms of the present invention the two last-mentioned drawbacks of the known measuring system are avoided and in some forms it is furthermore possible to eliminate the first-mentioned drawback of a relatively great consumption of energy.

According to the invention a transformer in connection with a direct-current measuring instrument is employed for measuring currents of very high frequencies, known means being provided between the secondary winding of the transformer and the direct-current instrument for converting alternating current into direct current. It has been unexpectedly found that the view hitherto held that a transformer could not be employed for the highest possible frequencies does not prove correct. On the contrary, tests have shown that transformers may be employed even for frequencies which correspond to a wave length of only a few meters.

The use of a transformer eliminates the two main drawbacks of the thermo-converter, in so far as the transformer may be overloaded on the primary side practically at will and, therefore, there is no longer any danger of an interruption of the main circuit. Furthermore, an insulation also reliable for high potential differences may be easily provided between the primary and secondary winding of the transformer.

As regards the use of a transformer for high frequencies it has further been found that the ferromagnetic core for coupling the primary and secondary winding need not be dispensed with; on the contrary such a ferromagnetic core may be readily used for the highest possible frequencies. Thus, measuring instruments according to the invention provided with a ferromagnetic core have been manufactured for measuring the intensity of current in the case of a wave length of only 6 m. With particularly short wave length the use of a ferromagnetic core may be, however, also entirely dispensed with without there being an insufficient coupling between the primary and secondary conductor.

The means for converting the alternating current taken from the secondary conductor in direct current suitable for the direct-current measuring instrument consist preferably in so-called dry rectifiers. By dry rectifiers are to be understood copper oxide rectifiers and selenium rectifiers.

Another means consists in the use of a thermo-converter whose heating conductor is connected to the secondary conductor of the transformer, whereas the direct-current measuring instrument is fed by the thermo-element. It is true, that such a thermo-converter requires as compared to the above-mentioned rectifiers a greater amount of energy; however, it has in some respects advantages which justify its use in the above-mentioned combination. Besides the very accurate measurements obtained thereby an advantage is to be seen in the very low capacity between the heating conductor and the thermo-element, which results in a correspondingly small capacitive displacement current from the conductor carrying the current to be measured to the testing circuit proper.

In the accompanying drawing is shown an embodiment according to the invention in diagrammatic form in which Fig. 1 shows the fundamental construction of the measuring apparatus and Figs. 2 and 3 show in detail the means for converting the alternating current into direct current.

In Fig. 1, I denotes the conductor carrying the current to be measured in which is inserted the primary conductor 2 of a transformer designed as a bar transformer. An insulating sheath 3 which is made of high-grade insulating material, and whose dimensions are so chosen as to correspond to the voltage of the current to be measured, surrounds the conductor 2 and is provided with a metallic coating 4. The central portion of the sheath 3 is surrounded by a circular iron core 5 on which is arranged the secondary winding 6 of the transformer. The means for converting the secondary alternating current into direct current are enclosed in the casing 7. 8 denotes the direct-current measuring instrument supplied with direct current. The metallic coating 4 of the insulating sheath 3 is electrically connected to one terminal of the measuring instrument 8, preferably to that terminal which, as shown, is grounded. This arrangement serves the following purpose. In case of high-frequency, a transformer is also to be regarded as a condenser, the primary conductor of the transformer forming the one and the secondary conductor forming the other electrode of this condenser. Therefore a capacitive displacement current could flow from the primary conductor to the secondary circuit and impair the measurement. The grounded coating 4, however, carries off this displacement current and makes it ineffective.

Fig. 2 shows the means enclosed in the casing 7 in Fig. 1 which are employed, for instance, in connection with copper oxide rectifiers, for converting alternating current into direct current, the reference characters a to d in both figures denoting the corresponding supply conductors. The conductors a and c are connected with each other through a plurality of series-connected copper oxide rectifiers 9 and a resistor 10, whereas the supply conductors b and d are directly connected with each other. A capacitor 11 is inserted between the conductors b, d and the junction of the series-connected rectifiers 9 with the resistor 10.

The rectifiers 9 serve to rectify the current supplied to measuring instrument 8. To this end, a single rectifier would suffice. The series-connection of a plurality of rectifiers is preferably employed, since the interfering capacity of the rectifiers is thereby considerably diminished. The capacitor 11 is necessary for the following reason. Most of the usual rectifiers have a certain capacity. That applies especially to dry rectifiers which consists of metal plates covered with insulating layers and which therefore may be regarded as condensers. The capacity of these rectifiers is negligible at low frequencies. If, however, such rectifier is connected to a high frequency voltage, a capacitive displacement current of considerable strength flows over the rectifier so that the direct current component produced by the rectifying effect may be small and ineffective compared with the high frequency displacement current. The capacitor 11 now serves to carry off the impairing high-frequency component and thereby keeps it away from the direct-current instrument. The capacitive current passing the rectifiers further would have the possibility to flow through the coil of the direct-current instrument 8 and through the capacitor 11. Since, however, the reactance of the capacitor 11 is very small compared with the great inductance of the instrument, practically the whole alternating current flows over the capacitor. Due to the small reactance of the capacitor 11, the voltage drop in the capacitor is very small, so that almost the full alternating current voltage is applied to the rectifiers 9, this bringing about a direct current capable of being measured by the instrument.

The resistor 10 serves a particular purpose, i. e., to eliminate temperature errors resulting from the fact that the resistance of the rectifiers 9 varies with the temperature. Indicating instruments of the above-mentioned character are extensively employed particularly in transmitting stations and are, therefore, frequently subjected to differences in temperature between the rectifier and the atmosphere which may easily attain values up to 200 degrees Fahrenheit. Since, however, the resistance of the rectifiers increases considerably with decreasing outside temperature, the resistor 10 is made of a material whose resistance decreases to the same extent as the temperature decreases, i. e., the magnitude of the resistor 10 varies in accordance with temperature inversely as the resistance of the rectifier.

The particular resistor 10 may be dispensed with in many cases. The errors resulting from the variations of the resistance of the rectifiers in accordance with the temperature may be, on the one hand, considerably reduced by amply dimensioning, as compared to the resistance of the rectifier, the resistance of the testing circuit connected to the secondary conductor of the transformer by correspondingly selecting the resistance provided in the measuring instrument for compensation. In this case, changes of the resistance of the rectifier cause only relatively small indicating errors. Compensation of the rectifier temperature error may be attained, on the other hand, by loading the rectifier to such an extent that it is additionally heated in an appreciable manner by the secondary current upon a decrease in outside temperature owing to the increase of the resistatnce of the rectifier caused thereby.

Fig. 3 shows the means enclosed in the casing 7 shown in Fig. 1 which are employed in connection with a thermo-converter for converting alternating current to direct current. In this case, the supply conductors a and b are directly connected with each other through the heating conductor 12 of the thermo-converter, whereas both terminals of the thermo-element are directly connected to the measuring instrument leads c and d.

In many cases a special graduation of the measuring instrument is for the sake of convenience provided particularly when measuring high-frequency currents. For instance, such a high-frequency ammeter is in most cases employed for tuning purposes. In this connection, it must be taken into consideration that the attendants have as a rule little experience. In the case of a linear graduation the maximum deflection of the instrument might lie at different points of the scale, whereby persons having little experience are liable to get easily confused so that in such a case it is convenient that the divisions of the scale be crowded toward the end, the pointer in this case lying always in the scale half containing the higher values to be measured even in the case of intensities of current differing considerably from one another. To obtain this the pole pieces of the measuring instrument may, as shown in Fig. 1, be for instance so designed that the air gap in which the coil moves steadily increases with increasing deflection.

In other cases in which a greater accuracy in indication is required within a narrow range provisions may be made, for instance, by giving the pole pieces any suitable shape, in order to fulfill such conditions.

I claim as my invention:

1. In an apparatus for measuring high-frequency alternating currents, a transformer having a primary conductor insertable into the circuit to be measured and a secondary conductor, a direct-current measuring instrument, dry rectifiers connecting said secondary conductor with said direct-current measuring instrument, a capacitor connected in parallel relation to the direct-current measuring instrument, the total resistance of the circuit connected to said secondary conductor being a multiple of the resistance of said rectifiers.

2. In an apparatus for measuring high-frequency alternating currents, a transformer having a primary conductor insertable into the circuit to be measured and a secondary conductor, a direct-current measuring instrument, dry rectifiers having inherent resistance connecting the direct-current measuring instrument with said seconday conductor, a capacitor connected in parallel relation to said direct-current measuring instrument and an additional resistance in the measuring instrument circuit, the magnitude of said additional resistance varying in accordance with the temperature inversely as the resistance of said dry rectifiers.

3. In an apparatus for measuring high-frequency alternating currents, a transformer consisting of a primary conductor insertable into the circuit to be measured, a ferro-magnetic core surrounding said conductor, and secondary windings on said core, a direct-current measuring instrument, dry rectifiers connecting said direct-current measuring instrument with said secondary windings, and a capacitor connected in parallel relation to said direct-current measuring instrument, said transformer being designed to load said rectifiers to such an extent that they are additionally heated by the secondary current upon a decrease in the outside temperature owing to the increasing rectifier resistance.

4. In an apparatus for measuring high-frequency alternating currents, a transformer having a primary conductor insertable into the circuit to be measured, a secondary conductor and a conductive screen disposed between said primary and said secondary conductor for carrying off capacitive displacement currents, a direct current measuring instrument, and a thermo-converter connecting said direct current measuring instrument with said secondary conductor.

5. In an apparatus for measuring high-frequency alternating currents, a transformer having a primary conductor insertable into the circuit to be measured and a secondary conductor, a direct current measuring instrument, a chain of series-connected dry rectifiers connecting said direct current measuring instrument with said secondary conductor, the number of the rectifiers forming said chain being chosen so as to reduce the capacity of said chain to a non-disturbing value with respect to the measuring result, and a capacitor connected in parallel relation to said direct current instrument for shunting residual high-frequency currents passing through said chain around said instrument.

6. In an apparatus for measuring high-frequency alternating currents, a transformer having a primary conductor insertable into the circuit to be measured, a secondary conductor and a conductive screen disposed between said primary and said secondary conductor, a direct current measuring instrument, means for converting the alternating current of the secondary conductor into direct current, said means connecting said direct current measuring instrument with said secondary conductor, and means for shunting high-frequency displacement currents flowing from said primary conductor to said screen around said converting means.

7. In an apparatus for measuring high-frequency alternating currents, a transformer having a primary conductor insertable into the circuit to be measured, a secondary conductor and a conductive screen disposed between said primary and said secondary conductor, a direct current measuring instrument, at least one rectifier connecting said secondary conductor with said direct current measuring instrument, a capacitor connected in parallel relation to said direct current instrument, and means for shunting displacement currents flowing between said primary conductor and said screen around said rectifier.

8. In an apparatus for measuring high-frequency alternating currents, a transformer consisting of a single primary conductor having terminals on both ends for connecting the circuit to be measured, a cylindrical insulator covering said primary conductor, a ferromagnetic core surrounding said insulator, secondary windings on said core and a conductive layer disposed between said insulator and said secondary windings, a direct current measuring instrument, means for converting alternating current into direct current, said means connecting said secondary windings with said direct current instrument, and means for shunting displacement currents flowing between said primary conductor and said screen in order to render said currents ineffective.

JOSEF STANEK.